INVENTORS
WILHELM ERNEST ROTHE
AARON GEORGE LOUGHEAD
BY Kirschstein, Kirschstein & Ottinger
ATTORNEYS INVENTORS
WILHELM ERNEST ROTHE
AARON GEORGE LOUGHEAD
Kirschstein, Kirschstein & Ottinger
ATTORNEYS

3,373,499
PORTABLE NORTH-INDICATING GYROSCOPIC INSTRUMENT
Wilhelm Ernst Rothe and Aaron George Loughead, Huntsville, Ala., assignors to Belock Instrument Corporation, College Point, N.Y., a corporation of New York
Filed Mar. 30, 1964, Ser. No. 355,643
4 Claims. (Cl. 33—226)

This invention relates to a portable instrument for indicating a true north direction by utilization of a gyroscopic mechanism to sense the direction of the earth's rotation.

It is the principal object of this invention to provide a portable north-indicating instrument, i.e. an instrument that can be carried by hand, which is accurate in indicating a true north direction, which quickly achieves such indication and which may be operated and read by a user in the field with relatively little training and experience. Specifically, the north-indicating instrument which embodies my invention is a compact, highly portable relatively improved replacement for a conventional hand held north seeking magnetic compass, and which, while including all the well known advantages of such a magnetic compass, is yet constructed to indicate true north rather than magnetic north under all conditions and locations of field use.

The conventional portable magnetic compass has several shortcomings inherent in its principle of operation. Every such instrument senses the earth's magnetic field lines by means of a magnetic element that orients itself parallel to such lines. However, as is well known, the earth's magnetic field lines only approximate the direction of true north and further are subject to both long term and local immediate variations.

An instrument dependent on the earth's magnetic field for an indication of true north is always in error because of the phenomenon that the earth's magnetic poles, between which the earth's magnetic field lines run, are not coincident with the earth's geographical (rotational) poles. At every different longitudinal and latitudinal position at which such a magnetic instrument is employed, a correction value known as the declination angle must be introduced to compensate for this misalignment. Since a small field compass is likely to be used in numerous different geographical areas, such declination angles must be supplied for every area in which the compass might be used.

The earth's magnetic fields themselves undergo continual irregular changes, the cause of which is not yet fully understood and which are thought to be in part attributable to solar energy bursts and the Van Allen radiation belts. Such variations require that the corrective declination angles be constantly updated for specific localities and information thereof be widely distributed to users of such instruments.

Local variances in the magnetic field lines result from large ferro-magnetic masses in the ground and changes of a spurious nature result from the occasional immediate adjacency of smaller masses of such material located near the measuring instrument. For this reason, for example, it is improvident to use such an instrument near a vehicle protected by heavy sheets of ferro-magnetic metal as a tank or an armored car, or near a piece of artillery.

These inaccuracy-inducing factors limit the utility and desirability of the portable magnetic compass, and their correction or minimization requires the constant awareness of the user to their causes. Corrective declination angle tables, recently checked, must be utilized to obtain good readings and even then the area of intended use should be free of localized disrupting ferro-magnetic masses to obtain a fair and accurate reading. Such instruments are of limited value in areas where the proper angle of declination is not known. This is of particular disadvantage in view of the speed by which a user may be transported from one location to another.

It is the elimination of these deficiencies to which the present invention is directed, while, at the same time retaining the redeeming features of a small hand carried compass.

Thus, it is an object of this invention to provide a portable north-indicating gyroscopic instrument which does not rely on the earth's magnetic field lines, but rather, which depends on the earth's rotation for its orientation. The instrument will thus be independent of the differences between true north and magnetic north, and will be unaffected by either long term or spurious ferro-magnetic masses.

It is a further object of this invention to provide a portable north-indicating gyroscopic instrument which is particularly suited for a technical and logistic use in the armed forces and which has the desirable military characteristics of rapid setup and reaction time, rapid accuracy in determining a true north direction, and rapid readout ability of the true north direction, which is extremely durable and maintenance free, and which will operate under all conditions and in all terrain without interference by magnetic or radiation influences.

It is a further object of my invention to provide a portable north-seeking gyroscopic instrument of the character described which features fast and simple visual readout easily observable by an operator in the field, which is rugged in construction yet small in size, and which has an all-weather capability.

It is an ancillary object of my invention to provide a portable north-seeking gyroscopic instrument of the character described which may be used by an operator familiar with a conventional compass and target-sighting apparatus with only a minimal amount of additional training so that the instrument may be utilized with presently existing maps, charts, instruments, and the like already in use by field armies so as to provide a compass replacement which may become integral with artillery and other military systems used with present compasses.

It is yet another object of my invention to provide a portable north-indicating gyroscopic instrument of the character described which is suited in design and construction to mass-production methods, which has a minimum of moving parts and high reliability so as to supply the armed forces with a low cost yet high quality instrument.

Gyroscopic instruments for determining direction presently used on aircraft and in missiles are wholly unsuitable for the solution of the problems which have been indicated. Such equipment is very costly and it would be impractical to distribute, due to this cost factor alone, such instruments to numerous military troop units. Such equipment is delicate and not able to stand the rough treatment of constant field use.

Other disadvantages of such presently known equipment are the necessity for bulky auxiliary equipment, such as a heavy duty power source for the energization of the equipment. Such instruments also usually require trained technicians for their operation. The gyroscopic instrument of the present invention eliminates these drawbacks by incorporating gyroscopic principles in an easily operable low cost instrument designed for mass distribution and for prolonged field duty, wherein it will accurately and quickly yield directional information.

In accordance with the present invention, a spinning sphere gyroscopic instrument is utilized to sense the rotation of the earth and thereby to indicate a true north direction. The instrument features a rotating sphere enclosed by and captured within a spherically-hollow rotating cage, the sphere being supported free of the cage by a suitable liquid. The cage is mounted on a platform stationed on the ground and is drivingly rotated about a vertical axis, vertical as used in this specification meaning coincident with a radius emanating from the center of the earth. The rotation of the cage is, by virtue of the frictional hydraulic coupling produced by the suspending liquid, transmitted to act upon and therefore rotates the sphere. The sphere is constructed with a non-uniform polar cross-section so as to have a preferred axis of rotation, i.e. a spin axis toward which it will tend to migrate upon rotation of the sphere on any other axis.

The cage may be considered as an earth-fixed support for the sphere since the vertical axis about which the cage spins shifts, with respect to space, with the earth as the earth rotates about its geographical poles. However, the sphere, when it is spinning, has the gyroscopic characteristic of attempting to maintain its axis regardless of the earth-induced shift of axis which the rotating cage is experiencing.

The described tendency of the spinning sphere to maintain its spin axis with respect to space leads to the denomination of its axis as a spaced-fixed axis.

With the foregoing thumbnail sketch of the structure of the gyroscopic instrument in mind, the following analysis of its principle of operation will be readily understood by those familiar with the art.

The cage is rotated about a vertical axis at a suitable speed and the suspending liquid transmits this rotation to the sphere. Initially, the preferred spin axis of the rotating sphere is coincident with the earth-fixed vertical spin axis of the rotating cage.

Immediately thereafter, there will be a disalignment between the axes of these two rotating elements due to the shift of the earth-fixed axis and the tendency toward maintenance of its own axial orientation by the spinning sphere. A short time after the initiation of operation, a constant lag angle will develop between the two axes. Since the earth-fixed axis has been rotated westwardly with the earth about the earth's axis of rotation, the shift takes place in an east-west plane, i.e., a plane perpendicular to the earth's axis of rotation. The lag angle is maintained in a steady state by the restraint of the hydraulic coupling effected by the supporting liquid. A vector analysis of the forces acting on the sphere is set forth in copending application Ser. No. 172,949 entitled "Meridian and Latitude Indicator," filed Feb. 13, 1962 by Rothe et al. Also, reference is made to copending application Ser. No. 223,050 entitled "Gyroscopic Indicating Device," filed Sept. 12, 1962 by Rothe et al., now Patent No. 3,283,409.

The direction of shift of the axes being east-west, a true north direction may be determined simply by ascertaining the horizontal perpendicular to the indicated east-west line of shift.

Since the aforesaid lag angle between the axes of rotation is extremely small (in the range of 1°), an accurate and sensitive readout means allows visual observation of the direction of shift which is used to determine a true north direction.

As an example, the readout means utilizes two superimposed initially coincident concentric Fresnel figures, one fixed to the spinning sphere centered on its upper pole and the other fixed to the spinning cage at a similar location. When the axes of the cage and the sphere shift and are no longer coincident, the figures are angularly displaced and a moiré pattern of spaced parallel lines appears. The lines of the pattern are perpendicular to the direction of displacement of the sphere and cage axes. Sighting along a reticle which is aligned parallel to the moiré lines indicates a true north direction.

The foregoing and various other objects and advantages of the invention will become apparent to the reader in the following description.

The invention accordingly consists in the features of construction, combinations of elements and arrangements of parts which will be exemplified in the devices hereinafter described and of which the scope of application will be indicated in the appended claims.

In the accompanying drawings in which are shown various possible embodiments of the invention, FIG. 1 is a three-quartered front perspective view of a portable north-indicating gyroscopic instrument which incorporates the present invention;

FIGS. 6, 7 and 8 are top views of, respectively, the sighting reticle, and moiré pattern, and the superposition of the reticle and the moiré pattern;

FIG. 9 is an enlarged view of a few of the innermost rings of a Fresnel figure;

FIG. 11 is a schematic view of the electrical circuit incorporated in the instrument of FIG. 1.

Figure 1:
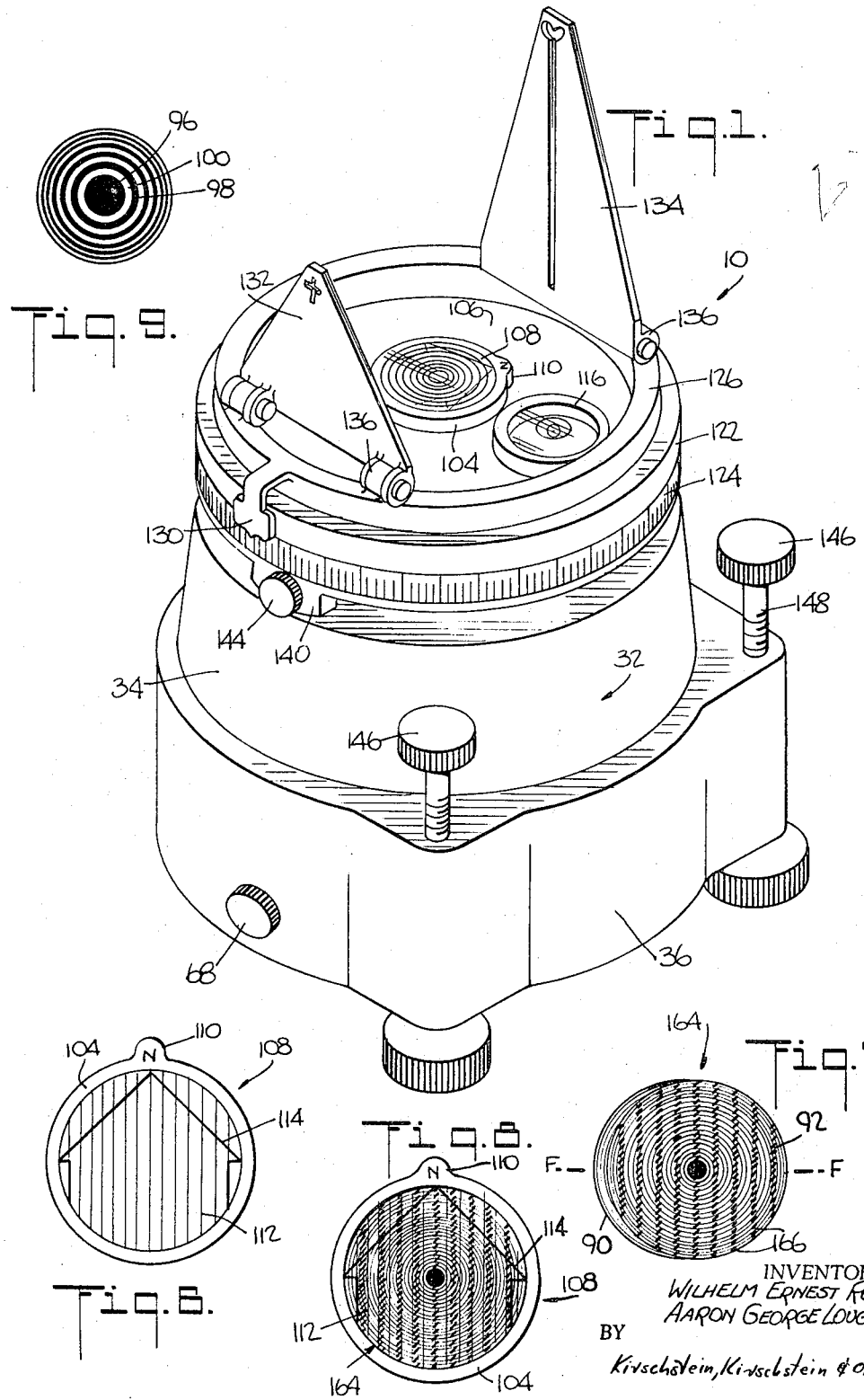
Figure 2:
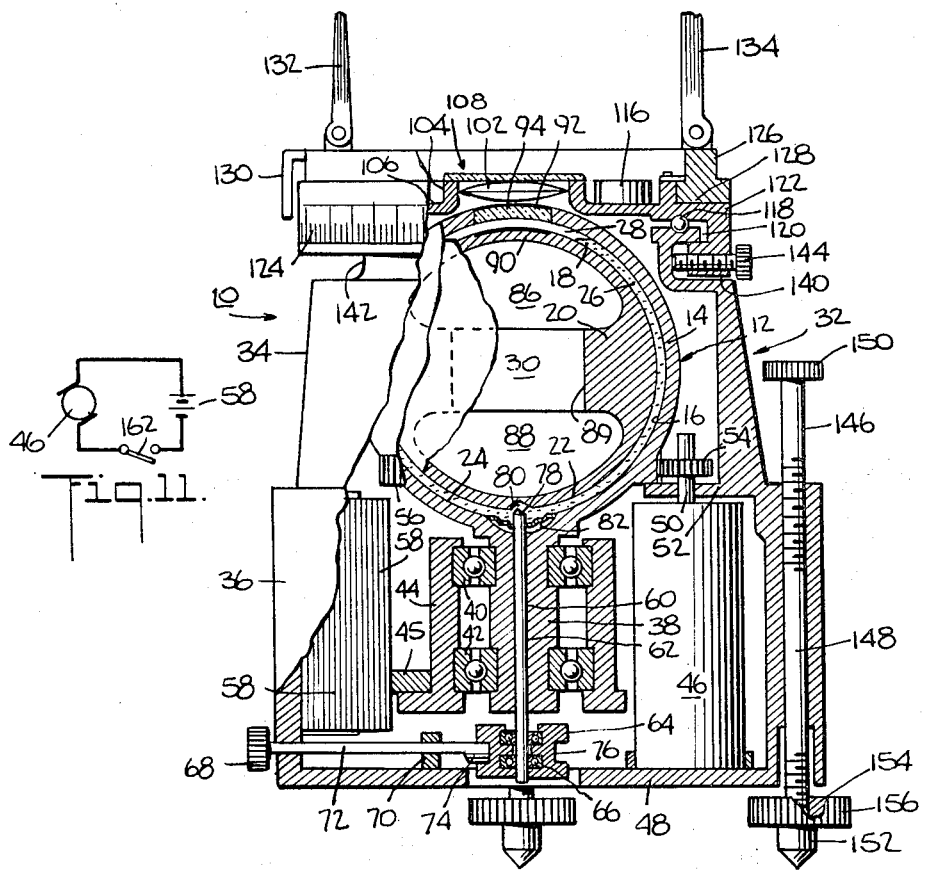
FIG. 2 is a partially broken-away side elevational view of the gyroscopic instrument.
Figure 3:
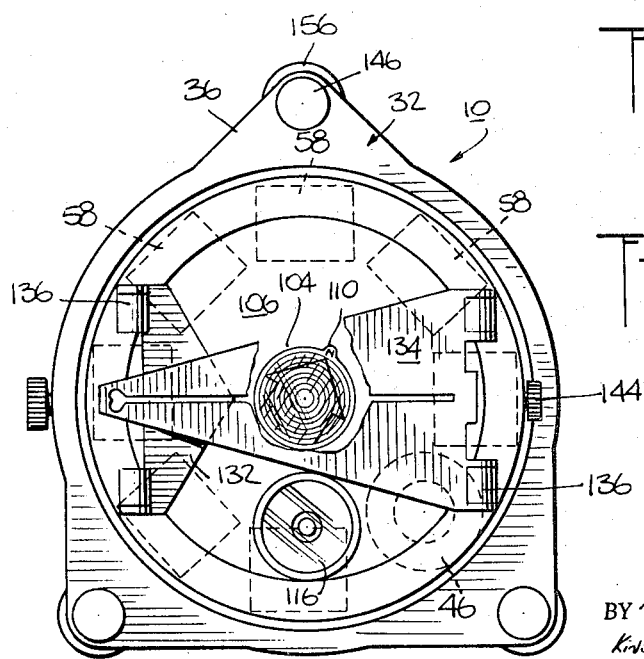
FIG. 3 is a top plan view of the gyroscopic instrument with the sighting means folded and partially broken away.

Referring now in detail to the drawings, and, more particularly, to FIGS. 1–9 and 11, the reference numeral 10 denotes a portable north-indicating gyroscopic instrument constructed in accordance with the present invention. The gyroscopic instrument 10 includes a cage 12 formed by a continuous wall 14. The wall 14 has an inner surface 16 which defines a spherical volume 18. Completely captured within and enclosed by the wall of the cage is a hollow sphere 20, having an outer spherical surface 22 of a radius which is less than the radius of the inner surface 16 of the cage 12. A gap 24 exists between the aforementioned spherical surfaces 16, 22. The difference in radii is quite small, for example in the order of hundredths of an inch, e.g., .015".

To obtain a buoyant fluid suspension of the sphere 20 within the cage 12, this being an essential characteristic of the instant invention, a mass of liquid 26, preferably of low viscosity, is located within, and partially fills, the gap 24. A gas bubble 28 fills the portion of the gap not occupied by liquid 26. As will shortly be described, the liquid 26 (when the instrument is in operation) serves both to approximately center the sphere 20 within the cage 12 so as to achieve a gap 24 of substantially uniform radial thickness between these two bodies as well as to effectuate a hydraulic coupling between them. The sphere 20 includes a hollow chamber 30 which makes the sphere buoyant in the denser liquid 26. The use of ethyl ether and a sphere formed from a lightweight metal, i.e., a beryllium alloy, will achieve the desired buoyancy. The materials from which the sphere and cage are formed are non-magnetic.

The gyroscopic instrument 10 includes a housing 32 which supports and encloses the cage 12 as well as numerous other components of the instrument. Said housing has, as an upper portion, a turret 34 and, as a lower portion, a base 36.

The cage 12 is supported and rotatably mounted within the turret 34 by a single stocky trunnion shaft 38 which is integral with the cage 12 adjacent the lower pole thereof. The trunnion shaft 38 is symmetrical about a vertical axis and depends vertically longitudinally downwardly from the cage 12, extending well into the base 36. Said shaft 38 is mounted to rotate about a vertical axis by two axially spaced, vertically aligned precision bearings, to wit, an upper annular bearing 40 and a lower annular bearing 42. The inner race of each bearing is fixed to the trunnion shaft 38 and the outer race of each bearing is fixed to the interior of a well 44. The well is fixed to the housing 32 by an inner wall 45. The cage 12 is thus free to rotate with the trunnion shaft about a vertical axis.

The cage 12 is driven by a speed governed low voltage DC motor 46 which is mounted on the bottom wall 48 of the base 36. An output shaft 50, powered by the motor 46, extends upwardly therefrom and is journalled in an internal wall 52 of the housing 32. A drive pinion 54 fast on the end of the shaft 50 meshes with an annular gear 56 of comparatively large diameter which is unitary with and girdles the cage 12 below the equator thereof. Upon energization of the DC motor 46, the annular gear 56 is driven so as to rotate the cage 12 with its supporting trunnion shaft 38 about a vertical axis.

The DC motor 46 is energized by numerous batteries 58 placed circumferentially internally of the base 36. Appropriate electrical hardware connects the batteries to the DC motor. A manually operable switch allows a user of the instrument to selectively energize the motor. The aforesaid electrical circuit is schematically diagrammed in FIG. 11.

In an embodiment of our invention, there is a gear ratio of 1:4 between the drive pinion 54 and the annular gear 56. In this form the cage attains a rotational constant speed of 4800 r.p.m. and a 20 gram centimeter torque is applied to the cage 12. Seven flashlight-type batteries can be suitably used and connected in parallel to provide a total operating time of seven hours per set of batteries. Assuming that three minutes will be necessary to determine a true north direction, one set of batteries will yield a total of 140 readings.

Means is provided to mechanically secure the sphere 20 within the cage 12 at desired times. Such securement is useful when, say, the instrument is not in operation and is being transported from one site to another or is being set up. In this instance, the securing means prevents movement of the sphere within the cage so that no damage to the parts can occur. Another purpose of the securing means is to effect common rotational movement of the cage and the sphere when the cage is initially brought up from rest to an operational constant speed. This latter function will be more fully described subsequently.

The securing means includes a thin solid elongated cylindrical pin 60 which is disposed vertically in an elongated bore 62 located centrally axially within the trunnion shaft 38. Lubrication within the bore 62 permits the pin to slide upwardly and downwardly (axially) within the bore.

The lower end of the pin 60 protrudes downwardly and outwardly from the lower end of the trunnion shaft 38 and is captured by a cylindrical collar 64. A set of bearings 66 connects the lower end of the pin 60 to the collar 64 so that, while the pin may rotate with respect to the collar, these two parts are joined for common axial upward or downward movement.

A manually operable locking spindle 68 is journalled both in the wall of the housing 32 and in an internal wall 70 and permits a user of the instrument 10 to effect the aforesaid locking engagement.

The spindle 68 has a knurled head external to the housing 32 and an elongated horizontal shaft 72 which has an offset end 74 located in an external annular groove 76 in the collar 64. When the crank of the offset end is rotated so that it extends downwardly it carries the collar 64 downwardly with it and thus shifts the pin 60 downwardly within the bore 62. Similarly, rotation of the crank of the offset end 74 of the shaft upwardly shifts the pin 60 upwardly within the bore 62.

The pin 60 has at its upper end a conical tip 78 which protrudes through the gap 24 between the walls of the cage 12 and sphere 20. A conical indent 80 is located at the bottom pole of the sphere 20 and is dimensioned to receive the tip 78 of the pin 60. The base of the conical indent 80 is larger than the tip 78 so that if the indent is slightly disaligned, it will yet receive the tip 78 when the latter is moved upwardly. The indent is also large enough to freely receive the tip 78 when the sphere is spinning freely within the rotating cage and at a maximum lag angle.

A liquid-tight annular flexible diaphragm 82 has its outer rim attached to the top of the trunnion shaft 38 and has its inner rim attached about the circumference of the pin 60 near its upper end, adjacent its tip. The diaphragm prevents liquid 26 from passing into the bore 62 while at the same time permitting axial shifting of the pin 60.

The sphere 20 is constructed so that upon rotation it will tend to turn about a preferred axis of rotation. That is to say, when the sphere 20 is rotated about any random axis, it will attempt to shift this axis until it is rotating about a preferred axis. This preferred axis runs between its geometrical north and south poles.

This tendency toward preferred axis of rotation is effected by the polar cross-section of the sphere. The sphere's contoured hollow chamber 30 comprises two axially opposed hollow compartments 86, 88 of the same contour and dimensions separated by a partition that is centrally apertured to provide a connecting tunnel 89. The tunnel is narrower in width than the widest portions of the chambers 86, 88 so that the major concentration of the mass of the sphere 20 is at its outer margin adjacent the sphere's equator. The aforesaid distribution of mass is symmetrical about a line drawn through the centers of the chambers 86, 88 and the tunnel 89, and is therefore symmetrical about the sphere's polar axis. Rotation of the sphere 20 about any axis will cause the mass of the sphere, by virtue of the effect of centrifugal force, to attempt to shift so as to rotate about its polar axis which is its preferred axis of rotation.

Accurate and sensitive readout means is provided to enable an operator of the gyroscopic instrument 10 to detect the direction of minute (in the range of 1°) angular changes between the axes of rotation of the sphere 20 and the cage 12 (the plane of the lag angle). Said readout means utilizes two concentric Fresnel figures, one Fresnel figure 90 being centered on the upper pole of the sphere 20 and the other Fresnel figure 92 being centered on the upper pole of the cage 12. The layout of the Fresnel figures 90, 92 is identical. The upper figure comprises a set of spaced alternately opaque and transparent concentric rings of equal area. The lower figure 90, which comprises a set of spaced concentric rings of equal area, each ring alternately being of a light and dark shade, may be imprinted on the sphere 20 or a plate bearing a Fresnel figure may be secured to this portion of the sphere 20. The upper Fresnel figure 92 is superimposed upon a transparent plate 94, the plate being held in place in an opening in the cage wall 14. The upper Fresnel figure 92 may be imprinted upon the plate 94 or this figure may be imprinted upon a thin transparent disc which is attached to the plate 94.

The configuration of the center and a few inner rings of a typical Fresnel figure is schematically illustrated in FIG. 9. A figure to yield highly accurate readout contains many moiré rings. The center of the figure comprises an opaque circular area 96. Concentric with the center area 96 but spaced therefrom is an innermost opaque ring 98 which is separated by a transparent ring 100 from the circular center area 96. The center area 96 and the ring 98, although of different configuration, each contain the same plan area. The Fresnel figure comprises additional alternate transparent and opaque rings, successive rings being of larger diameter but containing the same plan area as the center circular area 96.

In vertical alignment with the plate 94 is a biconvex magnifying lens 102 which is held in place by an upwardly turned circular flange 104 in the top wall 106 of the instrument 10.

Superimposed upon, as by imprinting, the biconvex lens 102 is a sighting reticle 108. Said reticle is illustrated most clearly in FIG. 6. The outer periphery of the reticle 108 comprises the circular flange 104. Said flange has a protruding nose 110 on which is placed the letter "N," indicating north. The reticle 108 further includes several parallel spaced index lines 112 which are imprinted on the biconvex lens 102. The outline 114 of an arrow is also imprinted upon the lens 102 which has its longitudinal axis parallel to the index lines 112 and is pointed at the letter "N" on the nose 110.

A circular bubble (spirit) level 116 of a conventional nature is also located on and held by the top wall 106 and is so situated that when the gas bubble in the level is centered therein, the instrument 10 has assumed a true vertical orientation.

The top wall 106 is rotatable about a vertical axis with respect to the housing 32. To this end, the outer rim of the top wall 106 rides on ball bearings 118 on a flat horizontal surface on an inwardly offset portion 120 of the wall of the housing 32. The top wall 106 has a peripheral skirt 122 which is seated over, but is slightly radially spaced outwardly from, the inward wall portion 120. The skirt 122 prevents the top wall from undesirably shifting on the housing 32.

The exterior exposed vertical face 124 of the skirt 122 is indexed, preferably with lines indicating minutes and degrees of the points of the compass, i.e. the cardinal points of the earth.

A sighting ring 126 is seated in an outwardly facing annular shoulder 128 on the outer margin of the top wall 106. Said ring 126 is rotatable about a vertical axis with respect to the top wall. The ring carries a pendent pointer 130 which is so positioned as to overlie the indexed face 124 of the skirt 122. Thereby, the angular position of the sighting ring 126 with respect to the top wall 106 may be visually observed by reading the position of the pointer 130 with reference to the index lines on said face.

The instrument 10 further includes two target sights 132, 134 which are mounted on diametrically opposed portions of the upper surface of the sighting ring 126. The target sights are of a type which are conventional to portable magnetic compasses and other instruments which require sighting of a distant object, and each contains a viewing aperture. The target sights are carried by trunnions 136 on the ring 126 and are movable from an erect upright position illustrated in FIGS. 1 and 2 to an inwardly folded overlapping position illustrated in FIG. 3, in which latter position both sights overlie the top wall 106. A telescope can be substituted for the target sights to achieve a more accurate target acquisition system.

A lock is provided to selectively fix the position of the top wall 106 with respect to the body of the housing 32. Said lock includes a protrusion 140 which hangs downwardly from the skirt 122. This protrusion rides in an annular groove 142 which is formed near the top of the housing 32 by the inward location of the wall portion 120. A locking screw 144 has its shaft engaged by a tapped bore radially disposed in the protrusion 140 and has an exposed head which may be readily reached and rotated by the hand of an operator. The inner end of the shaft can be forced against the base of the groove 142 by rotation of the locking screw so as to frictionally inhibit rotation between the top wall 106 and the housing 32.

Leveling means is utilized to orient the axis of rotation of the cage 14 along a plumb line vertical. Said means comprises three triangularly situated stations 146 planted on the ground and the circular spirit level 116 carried by the top wall 106. Each station 146 includes a heavy elongated threaded shaft 148 having a relatively coarse thread which is engaged by a tapped substantially vertical bore located in a projection of the base 36. Each shaft is topped by a knurled head 150 by which it can be readily rotated so as to raise or lower the station, thereby to make a quick, but gross, adjustment in the leveling of the instrument 10.

Each shaft 148 at its lower end carries a pointed foot 152 which includes a mechanism for achieving a finer adjustment in the leveling of the instrument. Each foot includes a tapped well 154 which engages a relatively fine thread cut on the lower end of the shaft 148. A lower portion of the bore is reamed out to prevent interference between these two parts. A knurled ring 156 is fast to the foot 152 to permit easy rotation of the foot on the lower end of the shaft 148.

Gross adjustments in attaining levelling of the instrument are attained by rotating so as to raise or lower each station relative to the housing 32. View of the spirit level 116 during this adjustment will indicate the correctness of the adjustment. Finer adjustment is thereafter made by rotation so as to raise or lower each foot 152 relative to its affiliated shaft 148.

The structure of the gyroscopic instrument 10 thus having been described, its mode of operation will now be set forth. When the instrument 10 is idle, the sphere 20 is pressed against an upper portion of the inner surface 16 of the cage 12 so as to prevent its movement therein. The prevention of movement within precision instruments is standard practice and is effectuated so that during transport of the instrument and during setting up of the instrument, no damage to its several parts can ensue. To achieve this idle position, the spindle 68 is turned 180° so that the crank on the shaft end 74 is turned upwardly whereby to move the collar 64 upwardly. Such movement of the collar shifts the pin 60 located in the bore 62 of the trunnion shaft 38 axially upwardly so that the tip 78 of the pin enters deeply into the conical indent 80 in the lower portion of the sphere 20. Further upward movement of the pin lifts the sphere and presses it against the top inner surface 16 of the cage.

The instrument 10 is prepared for use by planting its pointed feet 152 firmly in the ground. The target sights 132, 134 are unfolded to an erect position illustrated in FIGS. 1 and 2. The axis of rotation of the cage 12 is brought to a plumb line vertical by proper adjustment of the three stations 146 as described above. To achieve a sufficiently accurate true north measurement for field use, the level 116 and the stations 146 should permit alignment within six minutes of arc.

Now, the spindle 68 is rotated so as to retract the tip 78 of the pin 60 from contact with the indent 80. However it will be noted, as shown most clearly in FIG. 2, that the tip 78 of the pin 60 still protrudes slightly into the indent cavity so that its subsequent reinsertion therein is simplified. The sphere, during the course of operation of the instrument, will not tilt more than 1° so that the partial insertion of the tin in the indent cavity will not interfere with the proper operation of the instrument.

Figure 4:
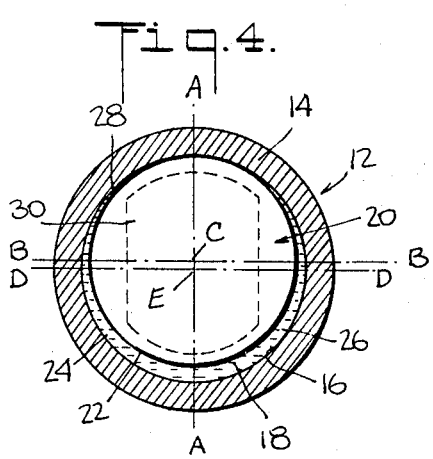
FIGS. 4 and 5 are, respectively, before and during operation schematic views of the sphere suspended by the supporting liquid within the cage.

FIG. 4 is a vertical cross-section which illustrates schematically the idle position of the sphere 20 within the cage 12 (the pin 60 being withdrawn and exerting no influence thereon). As has been previously described, the sphere 20 includes a hollow chamber 30 so that the average density of the sphere is less than the density of the liquid 26 which in part fills the gap 24 between the outer surface 22 of the sphere and the inner surface 16 of the cage 12. The sphere is buoyant in the liquid 26 so that the sphere presses against the upper inner surface 16 of the cage 12.

It will be evident that for this reason the gap 26 is thickest, in radial dimension, at the bottom of the internal cage volume 18, when the instrument is inoperative.

The hypothetical vertical and horizontal center lines A—A and D—D of the cage, shown in FIG. 4, intersect at a point E which represents the geometrical center of the cage volume 18. The center of gravity of the sphere 20, when the sphere is stationary, is represented by the intersection of the center lines A—A and B—B (a horizontal center line of the sphere) at a point C. It will be observed that the center of gravity C of the sphere is at this time displaced vertically upwardly from the geometrical center E of the cage 12.

Operation of the instrument 10 is initiated by actuation of the DC motor 46. The simple electrical circuit for the instrument 10 is schematically illustrated in FIG. 11. Said circuit comprises one or more parallel-connected batteries 58 connected to the DC motor 46. A manually operable switch 162 permits selective actuation of the electrical system.

The motor 46 drives the pinion 54 which meshes with the annular gear 56 which in turn rotates the cage 12. The cage is rotated about its trunnion shaft 38 on the bearings 40, 42 in the well 44. Since the axis of rotation of the cage 12 has been carefully vertically aligned by use of the leveling means, previously described, the cage 12 rotates about a plumb line vertical. The ultimate predetermined constant rotational speed of the cage is quickly reached. As has been mentioned heretofore this may be in the order of 4800 r.p.m.

Figure 5:
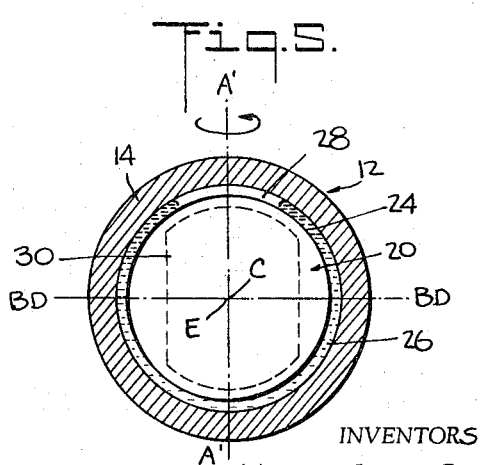

Rotation of the cage spins the liquid 26 which will thereupon exert a frictional drag on the sphere 20. Thus, the liquid will act as a hydraulic coupling so as to bring the rotational velocity of the sphere 20 up to the rotational velocity of the cage 12. Alternatively, the tip 78 of the pin 60 can be retained fully in the indent 80 so as to press the top of the sphere against the cage wall for common rotation until the cage has attained or approached its ultimate velocity, and then released. This technique brings the sphere and the cage to a high velocity simultaneously and quickly. The rotation of the cage 12 and consequent rotation of the liquid 26 causes centrifugal force to act on the liquid 26 so that the mass of liquid tends to concentrate at the horizontal equator of the cage volume 18. Displacement of part of the liquid 26 from the bottom of the cage volume 18 towards the sides of the cage volume will force the sphere 20 downwardly and away from abutment against the top of the cage wall 14. With a proper balance of several factors, to wit, the density of the liquid 26, the weight of the sphere 20, the dimensions of the sphere and the cage volume, and the rotational velocity of the cage, the sphere 20 will assume an equilibrium position in which the sphere is freely suspended in the cage with the liquid acting as a thin film liquid bearing between the sphere and cage. The equilibrium position optionally is such that the sphere is approximately centered within the cage volume. This last named position is illustrated in FIG. 5. In said figure, the horizontal center lines B—B and D—D of, respectively, the sphere and the cage volume substantially coincide so that the center of gravity of the sphere C and the geometrical center of the cage volume E are substantially coincident.

With the approximate centering of the sphere thus achieved, it will be noted that the gap 24 is of substantially uniform radial dimension, the liquid 26 still filling the major portion of this gap and the gas bubble 28 filling the remainder of this gap.

To understand the further operation of the instrument 10 by which a true north direction is ascertained, let it be assumed that when the sphere 20 has achieved the same rotational velocity as the cage 12 and has moved to an approximately centered position within the cage volume 18, the axis of rotation of the sphere is both vertical and coincident with the axis of rotation of the cage.

Although the coincidence of the aforesaid axes probably takes place at some time during the increase in velocity of the sphere from its initial zero velocity to its ultimate predetermined constant velocity, the aforesaid assumption is used to clarify the instrument's mode of operation. Since the only critical point is the ultimate positions of said axes, and not their initial positions, the point in time at which this coincidence is reached is not critical in the operation of the instrument.

The axis of rotation of the sphere 20 is also its preferred axis of rotation. This latter axis of rotation is achieved by virtue of the polar cross-section of the body of the sphere. As has been previously described, the mass of the sphere is greatest around its equator so that when the sphere is rotated about any random axis, its equatorial mass will shift toward this location so that the sphere rotates about its preferred axis of rotation running between its geographical poles.

Thus assuming that there is a coincidence between the axis of rotation of the sphere and the axis of rotation of the cage at an initial point in the operation of the instrument, soon thereafter a disorientation or shift between these axes takes place. This shift is due to the fact that the axis of rotation of the cage is earth-fixed and the axis of rotation of the sphere is space-fixed, the sphere acting as a gyroscopic mass and the liquid thin film bearing acting as a universal gimbal.

The instrument 10 is, of course, fixed to the earth so that it will turn with the rotation of the earth about the earth's poles. The rotational axis of the cage was oriented along a plumb line vertical so that this axis as a whole will rotate with the instrument and the earth on which the instrument is fixed.

The axis of rotation of the sphere 20 is about its preferred axis of rotation and as the sphere is rotated, it acts as a gyroscopic mass and tends to maintain its preferred axis of rotation according to basic laws of physics. The sphere is freely suspended within the cage volume 18 and its only connection to the cage is by the hydraulic coupling effectuated by the liquid 26. Thus as the cage axis of rotation shifts with the rotation of the earth, the axis of the rotation of the sphere tends to remain stationary or space-fixed.

After some determinable and comparatively short time constant, equilibrium is reached and the hydraulic coupling caused by the liquid 26 will maintain the axis of rotation of the sphere at a constant displacement lag angle from the rotative axis of the cage. The angle is a function of the latitude of the instrument and of the physical variables e.g., the cage speed, the density of the sphere and liquid, the viscosity of thin liquid, the thickness of the liquid film, and the dimensions of the cage and sphere.

Since the axis of rotation of the sphere has tended to be space-fixed and since the axis of rotation of the cage has rotated west to east with the earth, the direction of shift between the cage and the sphere axes is true east-west and it is upon this physical principal that the gyroscopic instrument 10 operates.

Since under the conditions mentioned the shift will only be in the order of 1°, accurate and sensitive readout means are necessary to detect the direction of the shift. For this purpose, the aforesaid identical Fresnel figures, 90, 92 are utilized. It will be recalled that the lower of these figures 90 is superimposed upon the top polar region of the sphere 20 and is precisely centered on the sphere's upper pole.

The upper Fresnel figur 92 is suprimposed on the transparent plate 94 and is precisely centered on the upper pole of the axis of rotation of the cage. A magnified view of both of these Fresnel figures will be had by an operator of the instrument 10 through the biconvex lens 102 and through the transparent plate 94 separating the figures 90, 92.

When the Fresnel figures 90, 92 are vertically centered or coincident upon one another, only the pattern of the top figure 92 is observable. With a slight shift of the Fresnel figures off center from one another, caused by the disorientation of the axes of rotation of the sphere and the cage, a moiré pattern is produced and is observable through the biconvex lens 102.

The use of Fresnel figures with opaque and transparent rings of equal areas and the subsequent production of moiré patterns indicating direction of shift between such superposed figures is fully documented in an article entitled "Moiré Patterns" by Oster and Nishijima in the Scientific American, May 1963, pp. 54–63.

The pattern produced by the aforesaid shift of the said specific Fresnel figures is illustrated in FIG. 7. As seen therein, said moiré pattern 164 comprises a series of parallel lines 166. The figures have been shifted along the line F—F which, in an instrument 10, would correspond to a line in true east-west vertical plane. It will be seen that the lines 166 of the moiré pattern are each absolutely perpendicular to the line of shift and therefore, run in a true north-south direction.

The Fresnel moiré readout system detects small variances between the centers of the Fresnel figures. Hence this system provides an extremely sensitive manner of permitting visual observation of minor differences in the locations of the two figures and the system creates this condition immediately upon the occurrence of the shift. The aforesaid Fresnel system thus readily detects shifts in the order of one degree and much less lag between the axis of rotation of the sphere and axis of rotation of the cage.

In an actual application, utilizing a one inch radius of the sphere and providing a Fresnel figure containing fifty rings, the area of the center ring being .074 inch in diameter, etched on a one-half inch plate, with a 1° lag angle, six moiré lines for readout will be produced.

Upon the production of a north-south moiré pattern 164, and the observation thereof by an operator of the instrument through the biconvex lens 102, the operator thereupon lines up the reticle 108 superimposed on the lens parallel to the north-south lines 166 of the moiré pattern 164.

The reticle 108 is aligned by the rotation of the top wall 106, as by the hand of the user, on the ball bearings 118 and on the upper wall portion 120 of the instrument housing 32. The rotation of the top wall 106 is continued until the reticle lines 112 are parallel to the moiré lines 166. Since the moiré lines 166 are perpendicular to the east-west plane and since the lines 104 of the reticle 108 have been rotated to be parallel thereto, the arrow 114 formed in the reticle points true north (N). This true north orientation of the reticle is retained by tightening the locking screw 144 so that it binds against the annular groove 142 on the housing 32. Hence, since the housing 32 is stationary on the ground, the true north direction continues to be indicated by the direction of the reticle 108.

The true north direction having now been fixed, a user of the instrument can further determine the lay of an object by sighting the same through the viewing apertures in the target sights 132, 134. To this end, the sighting ring 126 is rotated until the object comes into view through the aligned viewing apertures in the target sights. Thereafter the pointer 130 carried by the sighting ring 126 will indicate the degrees between the true north direction and the direction of the object relative to the instrument.

It will be evident that the gyroscopic instrument 10 can be utilized either for determining true north, or for determining the lay of an object relative to true north.

Figure 10:
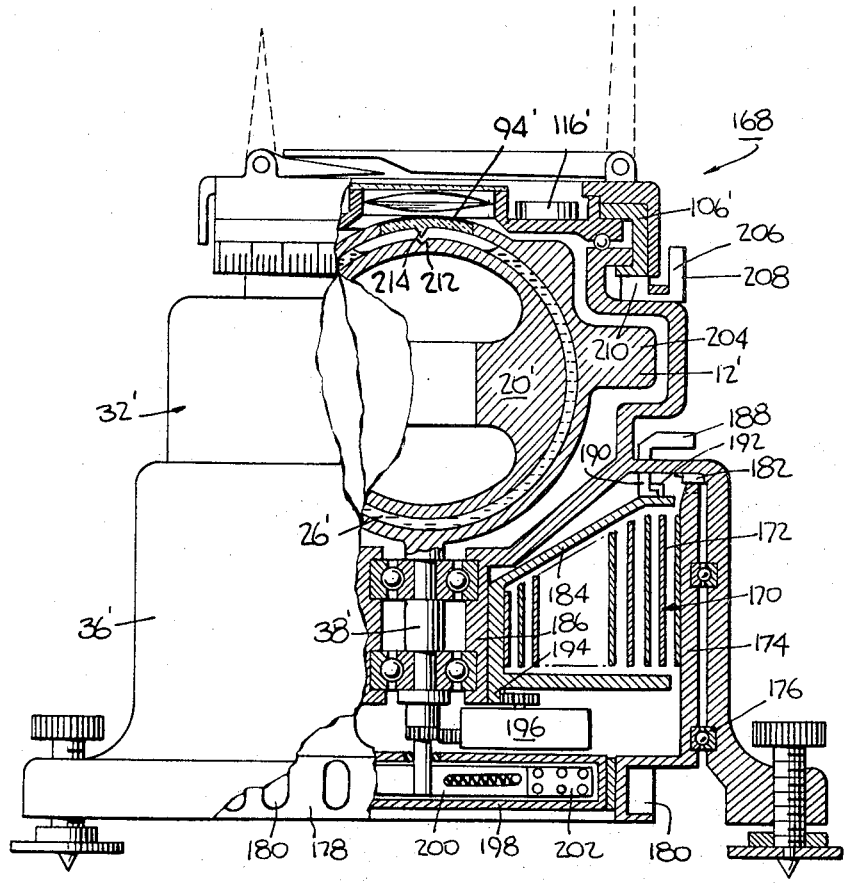
FIG. 10 is a partially broken away side elevational view of a second embodiment of the gyroscopic invention.

The reference numeral 168 designates a second embodiment of our invention, which is illustrated in FIG. 10. Only those parts of the structure of the second embodiment which differ from the structure of the first embodiment 10 of the invention will be described.

The lightweight motor which aids in rendering the gyroscopic instrument 168 capable of being hand carried here constitutes a hand-operable windup spring motor that drives the cage 12'. Said motor includes a heavy flat leaf coil spring 172. The inner convolutions of said spring are shorter in their vertical dimension than are the outer coils so that as the spring unwinds while it is driving the cage, a constant driving torque will be exerted thereon.

Said motor 170 is wound up by manual (hand) rotation of a cup 174 which is rotatably journalled within the base 36' of the housing 32'. Said cup is supported by bearings 176 located between the cup and the wall of the housing 32'. The cup 174 opens upwardly and supports therein the several parts of the spring motor 170. The cup 174 is rotatable about an axis coincident with the axis of the cage 12'.

The cup 174 has an exposed depending extension 178 of smaller diameter than the cup 174 and which is transversely spaced from the wall of the housing 32'. Said spacing permits an operator of the instrument 168 to place his fingers on the extension 178 so as to rotate the cup 174. Several spaced indented finger-holds 180 are located on the external surface of the extension 178 so that the same can be readily gripped by the fingers of the operator.

A pawl 182 pivoted internally of the housing wall adjacent the rim of the cup is provided to cooperate with ratchet teeth on the rim of the cup so that the cup 174 is rotatable in one direction only and will not unwind when released.

The outermost convolution of the spring 172 is fixed as by rivets to the inner surface of the cup 174, while the innermost convolution is fixed as by rivets to a rotatable reel 184. Said reel also is rotatable about a vertical axis coincident with the axis of rotation of the cage 12' and is journalled on an internal cylindrical wall 186 of the housing 32'. Said reel 184 is permitted to rotate by turning a small handle 188.

Said handle has an internal finger 190 which, in one position of the handle, engages the nearest one of a circular series of stops 192 disposed on the upper rim of the reel 184 and which in another position of the handle is clear of the path of travel of said stops. A gear 194 integral with the reel 184 drives a speed increasing gear train 196 which in turn drives at high speed the trunnion shaft 38' that supports the cage 12'.

Means is provided to govern the rotational velocity of the trunnion shaft 38' at a predetermined constant rate. The lower end of the trunnion shaft 38' extends into a hollow liquid-filled cylindrical compartment 198 fast to the housing 32'. Said lower end carries a paddle 200 which is rotated by the trunnion shaft end and which sweeps through the liquid-filled stationary compartment 198. This paddle 200 mounts a spring loaded perforate baffle 202 which is radially shiftable toward and away therefrom. The baffle 202 is biased radially inwardly.

The governing means is constructed so that when the trunnion shaft 38' is rotating at its desired predetermined velocity, the baffle 202 is extended sufficiently to produce a drag that maintains substantial equilibrium at such speed with the given torque of the motor.

In the second embodiment 168 of the gyroscopic instrument, the cage 12' has integral with it a heavy external ring 204 which is joined to the cage about its geographical equator. The location and the mass of the ring 204 exerts a flywheel effect that tends to stabilize the rotational velocity of the cage 12 as well as to enable the cage to retain its velocity over the operational period of the instrument.

A wedge-type lock, journalled in the wall of the housing 32', is utilized to selectively prevent rotation of the top wall 106'. This lock 206 is quicker in operation than the locking screw 144 which is shown in the first embodiment of our invention. Said lock is rotated by turning its handle 208. The lock carries an offset crank 210 which, when it is desired to lock the top wall 106' to the housing, is wedged into a space between these two parts. When it is desired to free the wall 106' for movement, the handle is rotated to clear the crank from the aforementioned location.

The sphere 20 has a conically shaped indent 212 on its upper pole and the transparent plate 94' on the cage 12 carries a downwardly pendant prong 214. When the instrument 168 is not in operation, the sphere 20', due to its buoyancy in the liquid 26', presses upwardly against the upper pole of the cage 12' so that the indent 212 is seated on the prong 214. The aforesaid interconnection prevents substantial movement of the sphere within the cage during transportation or setting up of the instrument.

When the instrument is operated, the sphere 20' is centered in the cage volume and the indent 212 withdraws from the prong 214. However, such movement is insufficient to clear the prong from the indent so that the tip of the prong still is within the indent cavity. The base of the indent is wide enough to prevent unwanted interference between these two parts. The aforesaid partial insertion limits the angle of shift between the cage and sphere axes to an angle slightly in excess of the maximum lag angle.

It thus will be seen that there have been provided devices which achieve the several objects of the invention and which are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described our invention, we claim as new and desire to secure by Letters Patent:

1. A portable gyroscopic instrument for determining the locations of the cardinal points of the earth with respect to the position of the instrument, especially in field use, said instrument comprising a cage, means to support said cage for rotation about a vertical earth-fixed axis, said cage having a hollow spherical interior, motor means for rotating said cage about said earth-fixed axis, a sphere having a mass distribution providing a preferred axis of rotation, said sphere being located within the cage, a liquid of greater density than the density of the sphere, said liquid being disposed within the cage and buoying the sphere and hydraulically coupling the cage to the sphere for mutual rotation, said liquid forming a thin liquid bearing film completely separating the sphere from the cage to freely support the sphere within said cage when the cage is rotated, so that the axis of rotation of the sphere is inertially space-fixed within the cage and due to the west-east rotation of the earth is displaced from the axis of rotation of the cage by a lag angle in the east-west vertical plane, and readout means for determining the orientation of the vertical plane of said lag angle whereby to ascertain the position of said instrument with respect to the cardinal points, said readout means including two Fresnel figures, one disposed on a pole of the cage and the other disposed on an adjacent pole of the sphere, which Fresnel figures when displaced in the direction of the lag angle produce a moiré pattern.

2. A portable gyroscopic instrument as set forth in claim 1 wherein each Fresnel figure has the same configuration and comprises successive rings each of equal area, the Fresnel figure disposed on the pole of the cage having alternate opaque and transparent rings, and the Fresnel figure disposed on the adjacent pole of the sphere having rings of alternate shades, which Fresnel figures when displaced in the directon of the lag angle produce a moiré pattern of numerous spaced parallel lines perpendicular to the direction of lag.

3. A portable gyroscopic instrument as set forth in claim 1 wherein the readout means also includes a rotatable reticle alignable with the moiré pattern to determine the direction of a vertical plane perpendicular to the direction of the vertical plane of the lag angle.

4. A portable gyroscopic instrument as set forth in claim 1 wherein the readout means also includes a rotatable reticle alignable with the moiré pattern to determine the direction of a vertical plane perpendicular to the direction of the vertical plane of the lag angle and locking means for selectively fixing said reticle in an aligned position.

References Cited

UNITED STATES PATENTS

| | | | |
|---|---|---|---|
| 1,378,291 | 5/1921 | Sperry | 114—23 X |
| 1,890,831 | 12/1932 | Smyth | 33—226 |
| 1,998,948 | 4/1935 | Wittkuhns et al. | 33—226 |
| 2,044,899 | 6/1936 | Carter | 33—226 |
| 2,871,706 | 2/1959 | Fisher et al. | 74—5 X |
| 2,911,832 | 11/1959 | Thierman | 74—5.7 |
| 2,950,698 | 8/1960 | Bennon | 114—23 |
| 3,162,053 | 12/1964 | Blitz | 74—5.7 |

FOREIGN PATENTS

| | | |
|---|---|---|
| 886,063 | 1/1962 | Great Britain. |

ROBERT B. HULL, *Primary Examiner.*

LEONARD FORMAN, *Examiner.*